Dec. 9, 1969    I. L. ASHKENAS ET AL    3,483,302
APPARATUS FOR MEASURING OPERATOR PERFORMANCE
Filed Feb. 15, 1965    2 Sheets-Sheet 1

INVENTORS
IRVING L. ASHKENAS
TULVIO S. DURAND
BY DUANE T. McRUER

ATTORNEY

INVENTORS
IRVING L. ASHKENAS
TULVIO S. DURAND
DUANE T. McRUER

BY

ATTORNEY

3,483,302
APPARATUS FOR MEASURING OPERATOR PERFORMANCE
Irving L. Ashkenas, Beverly Hills, Tulvio S. Durand, Inglewood, and Duane T. McRuer, Los Angeles, Calif., assignors to Systems Technology, Inc.
Filed Feb. 15, 1965, Ser. No. 432,702
Int. Cl. G09b 9/00
U.S. Cl. 35—10.2          17 Claims

ABSTRACT OF THE DISCLOSURE

A method and apparatus for constraining an operator's behavior during the performance of a simple tracking task, whereby a quantitative state of the apparatus infers a corresponding state of the constrained operator. In such tracking task, the human operator is subject to an element to be controlled and having adjustable dynamics of a divergent, or non-minimum phase, form; and either the gain or divergent tendency of the controlled element is varied.

---

In modern society useful machines are designed and operated for performing a variety of selected tasks under the direction of an operator; and may even be monitored and controlled by the operator. Hence, the optimum design of a useful machine for a specific, selected task often requires matching the ability of the human operator to control it, as well as matching the performance of the machine to the job to be performed. For example, many machines such as actuation elements serve as extensions of a human operator's muscles, performing actuation tasks far exceeding the strength of the human operator. However, the means of controlling such machine should, of course, not tax the operator's strength. Further, the speed of response of the controlled machine, or controlled element, to the operator's control thereof should be fast enough to achieve a desired rate of change in the output of the controlled element. In other words, in the combination of man and machine for the performance of certain tasks, the machine must be matched to the man or operator as well as being matched to the assigned task.

In the performance of certain control tasks, the man-machine combination cooperate as elements of a closed-loop control system. In such an arrangement, the machine or controlled element is controlled by the operator in accordance with the observed deviation between the actual performance of the controlled element and a selected criterion, so as to reduce such deviation. For example, in a fighter-aircraft employing a radar-aided, computing optical sight head, the aircraft or controlled element is flown or controlled by the pilot toward a selected target in such a fashion as to minimize the angular deviation observed between the pilot's line of sight to the target and a reticle projected by the computing sight head. Another example of a closed-loop man-machine combination is the attitude and re-entry trajectory control of a space capsule by a human operator so as to reduce the displayed deviation between the vehicle performance and a selected performance criterion.

The adequate performance of such tracking tasks involve the same consideration of closed-loop stability as are involved in the design of ordinary servomechanisms. In other words, the design of a closed-loop man-machine combination is similar to the design of a closed-loop analog machine. Several distinctions or differences exist, however. First, the human is essentially an unalterable element to which (or whom) the machine is adapted. Secondly, the human operator is self-adaptive, which means that he can, within limits, alter or vary the dynamics of his performance within the control loop so as to improve the overall performance of the man-machine combination. Such a characteristic of the human operator is significant in the closed-loop control of controlled elements whose dynamics tend to vary when subjected to variations in the operating enviroment. For example, it is well-known that the flight dynamics of a conventional aircraft vary as the airspeed and pressure-altitude of the aircraft are varied. Hence, in the adequate control of the aircraft in a closed-loop fashion by the operator or pilot, as in a fire-control tracking task, the operator's ability to vary his dynamics performance tends to compensate for any variations in the controlled vehicle dynamics. However, the inherent limits in the ability of the self-adaptive controller or human operator to so adapt his dynamic performance accordingly limit the dynamic range or style of transfer functions of controlled elements which are deemed "fitted to" or controllable by the operator in a tracking task.

Now, many other factors are involved in the design of a controlled element such as an aircraft, in addition to the factor of whether or not the controlled element is controllable by a pilot or selected class of operator. For example, the desired payload, speed and altitude ceiling intended for a specific aircraft affect the detail design involved, including the resulting flight dynamics or controllability of the aircraft. Similarly, in the design of a recoverable space capsule, considerations other than controllability will place design restraints upon the achievable controllability. Hence, in the optimum design of a controlled element or machine of a man-machine combination for the performance of tracking tasks, it is necessary to understand what quantitative limitations exit upon the transfer function or other describing function selected for analytically describing the self-adaptive human operator. From a consideration of such quantitative limits upon the mathematical model of the human operator's tracking performance, together with the transfer function of the controlled element, the system designer is enabled to determine (by means of standard servo analysis techniques) what changes need be made in the dynamic response characteristics of the controlled element, or to predict whether or not the controlled element can be successfully employed in a man-machine combination to adequately perform the assigned tacking task.

Accordingly, the measurement or determination of the quantitative parameters of the describing function or mathematical model of the human operator becomes of interest.

The simplest form of human operator describing function currently employed in man-machine studies is of the form (in Laplace notation):

$$Y_p(s) = K_p \left( \frac{T_1 s + 1}{T_2 s + 1} \right) e^{-T_p s} \qquad (1)$$

In other words, the transfer function of the human operator in the performance of a tracking task is deemed to be comprised of a gain factor $K_p$, a frequency sensitive factor corresponding to a lead-lag network, and a pure delay term. The gain factor ($K_p$) and frequency sensitivity lead-lag term $$\left( \frac{T_1 s + 1}{T_D s + 1} \right)$$

are both considered to be self adaptive, in that the self-adaptive pilot appears to adapt his tracking performance to the dynamics of the element to be controlled. In other words, the quantitative parameters $K_p$, $T_1$ and $T_2$ appear to change, as has been determined from observations of the performance of such tracking tasks. Such quantitative changes in the human operator describing function appear to correspond with quantitative changes desired from the standpoint of servo design, thus explaining the reference to the human operator as a self-adaptive controller. However, the limits of the tracking performance obtained from the man-machine combination appear limited mainly by the quantitative limits on that component of the human operator's ability which is described by the delay time factor $e^{-T_p s}$ (such time constant is to be clearly distinguished from that time delay associated with the measurement of an operator response to a step function input, such as the interval involved in manually starting and stopping a stop watch). While the general magnitude of the time constant $T_p$ is known, very little reliable data has been heretofore obtainable regarding the precise reaction time of the operator in a tracking task and the nature of the variation thereof, if any, with changes in the nature of the tracking task. Further, the methods used heretofore to determine such delay time or transfer lag during tracking have involved very difficult procedures. Moreover, it is because of the difficulty of such prior art procedures that the resultant quantitative data lacks the desired precision.

For example, a classical method of the prior art has been to measure a point-by-point frequency response of the amplitude ratio and phase shift of the pilot's output (i.e., his control or actuation of the controlled element) relative to the display of the system tracking errors, using Fourier analysis or a cross spectral density analyzer. Then, a selected combination of quantitative values are sought for the linear response terms $K_p$ and $$\left(\frac{T_1 s + 1}{T_2 s + 1}\right)$$

by curve-fitting the amplitude frequency response thereof to the measured amplitude ratio response curve. The corresponding phase-versus-frequency response for such selected combination is campared with the actual or measured phase response. The phase difference, or residual phase versus frequency, was then employed to determine the effective human operator delay time $T_p$ by means of the following relationship:

$$T_p = \Delta \phi_r / \Delta \omega \quad (2)$$

Where:

$T_p$ = time constant in seconds
$\Delta \omega$ = a selected interval of frequency in radians per second
and
$\Delta \phi_r$ = the change in the residual phase, in radians, associated with the selected frequency interval.

In other words, the time delay was determined as the average slope of the curve of residual phase versus frequency.

It is to be readily appreciated that the above described prior art method is not only very difficult, but produces a quantitative value for the time delay $T_p$ which is of limited accuracy. The accuracy, of the time-delay so determined, is limited by the accuracy of the measured frequency response of the operator dynamics $Y_p$, and is further subject to the skill of the analyst in the curve fitting procedure, both of which substantially affect the data points of the resulting residual phase curve from which an average slope is determined. The accuracy of the time-averaged results are also affected by the variability of the describing functions displayed by the operator over the time period of the data measurement interval.

The concept of the subject invention relates to apparatus for providing a critical tracking task which constrains the allowable behavior for a human operator engaged in the performance of such tracking task, whereby a quantitative state (e.g., gain and/or time constant) of the apparatus infers a corresponding state of the constrained operator, without the necessity of employing cross correlation computers, spectral density analyzers and the like. By means of the variation of a single parameter in the tracking situation, a direct indication may be obtained of a corresponding parameter of the operator describing function, thereby avoiding the complex analytical and curve-fitting techniques of the prior art.

In a preferred embodiment of the invention, a human operator, engaged in performing a tracking task, is subjected to an element to be controlled having adjustable dynamics of a divergent, or non-minimum phase, form. Either the gain or divergent tendency of the controlled element is then adjusted until the operator is unable to effectively control the element-to-be-controlled.

By means of the above described arrangement and method, the operator is required to constrain his performance within relatively narrow limits, whereby variability in the measured response of the operator is reduced. Also, because of the contraint upon the operator's performance of the tracking task, the operator's describing function is sufficiently related to the parameters of the tracking task, that the final quantitative state of the adjusted parameter is indicative of a corresponding parameter of such describing function. Further, because of the constrained nature of the form of operator describing function which results, more reliable measurements may be made of the performance differences between different operators, and of changes in the ability or state of a given operator. Accordingly, it is an object of the invention to provide means tending to constrain the describing function of an operator engaged in a tracking task.

It is also an object of the invention to provide an improved method for determining the minimum time-delay of an operator engaged in a tracking task.

It is another object of the invention to provide improved apparatus useful for the determination of the time-delay of an operator in a tracking task.

It is still another object of the invention to provide a method utilizing a controlled element having adjustable dynamics of a divergent form for determining the minimum time delay of a human operator in a tracking task.

It is yet another object of the invention to provide tracking-task simulation means comprising a controlled element having an adjustable dynamic response of a divergent form for determining the time-delay of a human operator.

It is a further object of the invention to provide means for quantitatively determining the parameters of a constrained form of an operator's describing function.

These and other objects of the invention will become apparent from the following specification, taken together with the accompanying drawings in which.

In the drawings, like reference characters refer to like parts.

Figure 1:
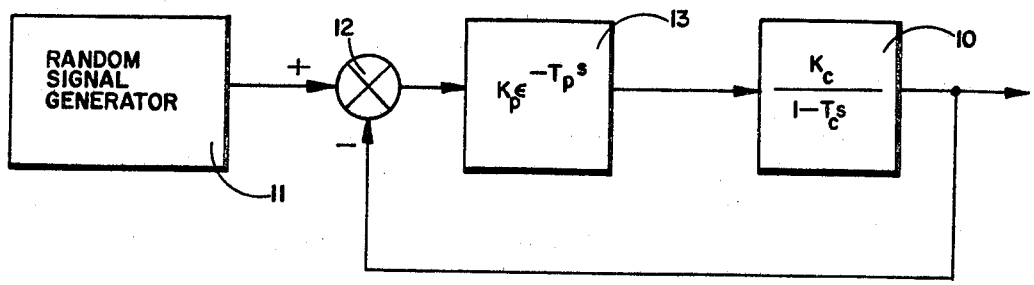
FIGURE 1 is a block diagram of a closed-loop man-machine combination, such as an operator performing a tracking task.

Referring now to FIGURE 1, there is illustrated a block diagram of a closed-loop man-machine combination such as an operator performing a tracking task. There is provided a controllable element 10, a source 11 of a control criterion, and signalling means 12 response to the condition of controllable element 10 and the control criterion for indicating the difference therebetween. In a fire control tracking situation, for example, the controllable element 10 may be a steerable weapon platform such as a fight-aircraft, source 11 may be an armament fire control radar or the computing elements of an optical sight head, and signalling means 12 may be the optical display of a sighting reticle projected by the sight head relative to the pilot's line of sight to a target (such as an enemy aircraft). Alternatively, signalling means 12 may comprise a cathode ray oscilloscope or other means well known in the art for providing an indication $E_0$ of the difference between an existing condition $\theta_0$ and a selected condition $\theta_i$. In the performance of an exemplary fire control tracking task, a pilot 13, in response to the difference signal $E_0$ or system error signals provided by signalling means 12, attempts to control the controllable element 10 in such a sense as to tend to reduce the magnitude of the system error signal. Hence, the pilot's performance represents one element 10 in the closed-loop arrangement depicted in FIGURE 1.

It has been discovered that where the dynamics or transfer function of the controlled element 10 are of a pure divergent form (represented in Laplace notation as a non-minimum phase term of the form $$\left(\frac{K_c}{1-T_c s}\right)$$

then the pilot's dynamics tend to assume a form described by a describing function of the form, $K_p e^{-T_p s}$. In other words, in a tracking task wherever the controlled vehicle dynamics are of a pure divergent form, the pilot's transfer function resembles a delay term, $e^{-T_p s}$, multiplied by a simple gain factor, $K_p$. The operator's gain $K_p$ can be demonstrated by servo theory to be within the limits required for stabilizing a control loop which includes a controlled element having a pure divergent dynamic response characteristic. Moreover, it has been further discovered that, in response to a random-appearing command signal $\theta_i$, the ability of the pilot to effectively control the controlled element tends to disappear as the time constant of the divergent dynamics of the controlled element is decreased.

In other words, the limit of the pilot's ability to stabilize the control loop, is determined by the minimum amount of phase-lag or adverse affect that the pilot's transport delay (represented by the term $e^{-T_p s}$ in the operator describing function) contributes to the system phase margin. Hence, as the time constant $T_c$ of the pure divergent form $$\left(\frac{K_c}{1-T_c s}\right)$$

of the controlled element dynamics, is decreased, the allowable upper and lower limits of pilot gain required to stabilize the system approach to each other. With the acceptable limits of the pilot's gain performance thus constrained, the minimum value of the operator delay $T_p$ in the term $e^{-T_p s}$ of the pilot describing function is indicated by the lowest value of the time constant $T_c$ of the pure divergent form of the controlled element for which stable tracking performance is achieved. Such result may be better appreciated from the servo analysis shown in FIGURE 2.

Figure 2:
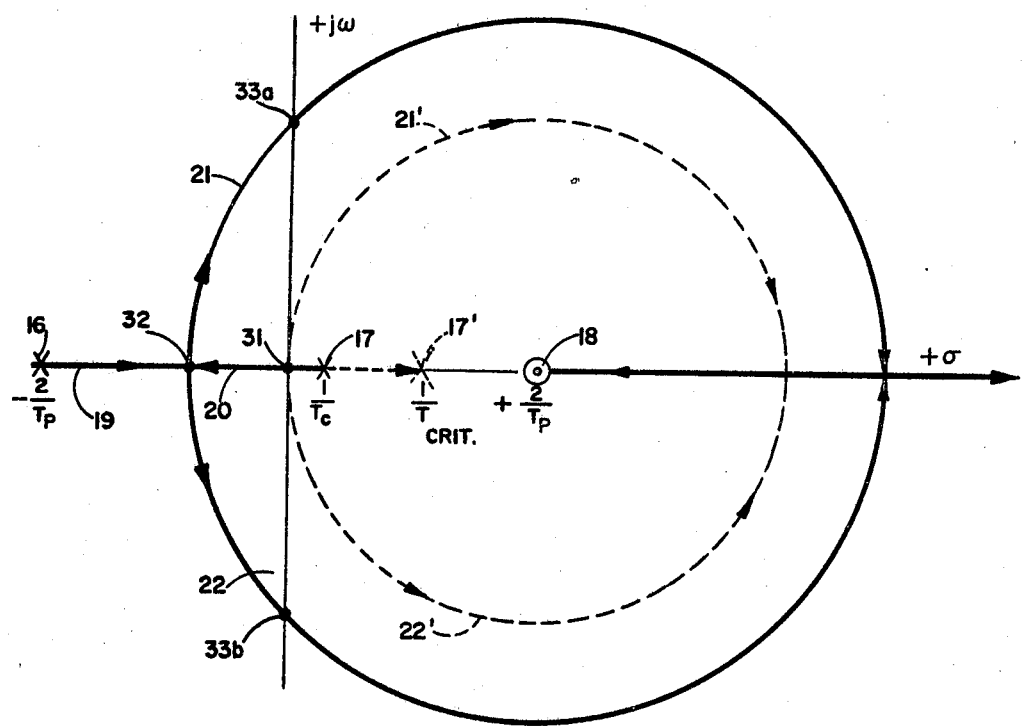
FIGURE 2 is a root locus diagram of the closed loop response for a selected dynamic model of the arrangement of FIGURE 1.

Referring to FIGURE 2, there are illustrated root locus diagrams of the closed-loop response of the arrangement of FIGURE 1 for a controlled element having a pure divergent dynamic form. In such diagrams the transport lag element $e^{-T_p s}$ of the describing function $Y_p$ for the human operator is represented by a first order Padé approximation. Hence, the expression for $Y_p$ is approximated as follows:

$$Y_p = K_p e^{-T_p s} \approx K_p \frac{\left(\frac{-T_p}{2}s+1\right)}{\left(\frac{T_p}{2}s+1\right)} \quad (3)$$

Such approximation is sufficiently accurate for frequency regions of interest below $2/T_p$ (i.e., $s=j^\omega < 2/T_p$). That this is so may be appreciated from the fact that the amplitude ratio of the expression, $$\left(\frac{-Ts/2+1}{Ts/2+1}\right)$$

is unity (the same as $|e^{-T_p s}| = |e^{-j\omega T_p}| = 1.0$), and the only frequency responsive effect of such expression at such low frequencies is a somewhat linear phase shift as a function of $T_p$ (the same as that associated with $$e^{-T_p s} = e^{-j\omega T_p})$$

Referring to FIGURE 2, there is illustrated a locus of the closed-loop poles or the roots of the characteristic equation of the closed-loop dynamics of the system of FIGURE 1, plotted as a function of the open-loop gain for two selected combinations of open-loop poles and zeros of $G(s) = Y_p Y_c(s)$. The root locus technique of demonstrating the variation in the roots of the closed-loop characteristic equation or denominator as a function of open-loop gain, is well known in the servo art, being fully described for example in "Control System Dynamics," McGraw-Hill (1954).

For the open-loop expression:

$$G(s) = Y_p Y_c(s) = (K_p K_c) \frac{\left(\frac{-T_p}{2}s+1\right)}{\left(\frac{T_p}{2}s+1\right)(-T_c S+1)} \quad (4)$$

the two denominator roots or poles, $-2/T_p$ and $+1/T_c$, are shown as X's plotted in the left-half and right-half planes respectively at points 16 and 17, the numerator root or zero, $+2/T_p$, being plotted in the right half plane and indicated by the symbol ⊙ at point 18. As is well understood in the servo art, the increase in the open-loop gain $K_p K_c$ of Equation 4 causes the value of the closed-loop poles to depart along the real axis from those of the open-loop poles (at points 16 and 17), as described by branches 19 and 20. As the gain is further increased, the two branches first meet on the real axis, and then break away above and below the real axis as two new branches 21 and 22, each being the mirror image of the other, the pair being a pair of complex conjugate roots indicating an oscillatory second order characteristic equation. Branches 21 and 22 ultimately terminate, one at the zero or numerator root 18 and the other at infinity on the real axis in the right-half plane, as is well understood in the art of servo analysis.

For the illustrated case in FIGURE 2, where the value of the non-minimum phase term for the pole indicated at point 17 is less than the non-minimum phase term for the zero indicated at point 18, the locus branches 21 and 22 are seen to generally described a circle about the zero, or numerator root, at point 18. The maximum gain for stable tracking is that gain at which zero damping occurs for the second order closed-loop system, indicated by the crossover of branch 21 from the left-half plane to the right-half plane at the points 33a and 33b. The minimum open-loop gain for which the system dynamic performance is stable is that for which the divergent branch 20 crosses into the left-half plane from the right-half plane along the real axis, indicated as point 31. However, where a fixed gain $K_c$ is employed in the term $$Y_c = \left(\frac{K_c}{-T_c s+1}\right)$$

then the maximum and minimum limits on the open-loop gain term $K_p K_c$ may be redefined as limits or constraints upon the acceptable gain performance $K_p$ of the human pilot.

Referring again to FIGURE 2, it is seen that as the value of $1T_c$ is increased or moved toward point 18 (i.e., $T_c$ is decreased), the circular form of branches 21 and 22 decrease in radius. In fact, when the value of $1T_c$ is made equal to one-half $2/T_p$ (the zero or numerator root of $Y_p$ at point 18 in FIGURE 2), the resulting circular locus branch indicated by the dotted arc is tangent to the origin (indicated as point 31). In other words, both the breakaway point 32 of the locus and the neutral stability points 33a and 33b of the locus now occur at and correspond to the zero divergence point 31 at the origin for a critical value of $T_c$. Such critical value of $T_c$ can be shown to be equal to the value of the delay time $T_p$ in the transport lag term $e^{-T_p s}$ of the operator describing function $(Y_c(s) = K_p e^{-T_p s})$:

$$\frac{1}{T_{critical}} = \frac{1}{2} \times \frac{2}{T_p} \quad (5)$$

Rearranging:

$$T_{critical} = T_p \quad (6)$$

Hence, that critical value of the time constant $T_c$ of a controlled element having a pure divergent dynamic response characteristic (i.e., of the form $$\left( \frac{K_c}{1 - T_c s} \right)$$

for which the upper and lower constraints upon the allowable system gain converge, is equal to the minimum effective time delay $T_p$ of the operator describing function. Accordingly, the determination of such time delay may be determined by the steps of subjecting the operator to a simulated tracking task, utilizing a controlled element of adjustable dynamics of the form $$\frac{K_c}{1 - T_c s}$$

and decreasing the time constant $T_c$ of the controlled element from a nominal value for which the pilot can conveniently perform the tracking task to a minimum or critical value for which he can barely maintain a stable tracking function. Such tracking task is referred to herein as a critical tracking task, an exemplary arrangement for the simulation thereof shown in FIGURE 3.

Figure 3:
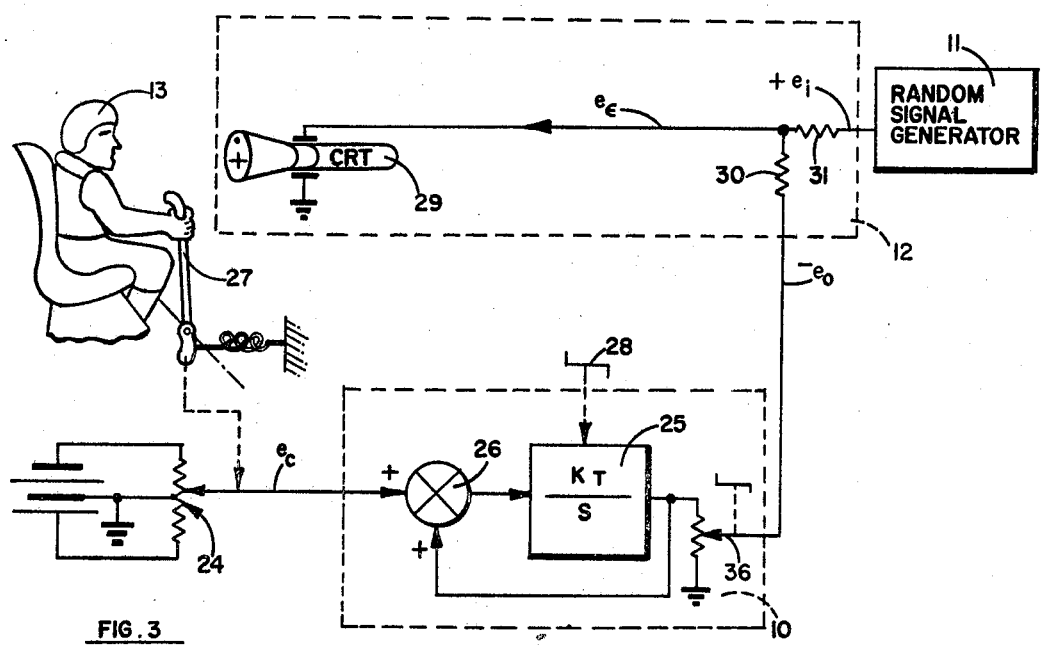
FIGURE 3 is a schematic arrangement of apparatus simulating a tracking task and employing the concept of the invention.

Referring to FIGURE 3, there is illustrated a schematic arrangement of apparatus for simulating a critical tracking task and employing the concept of the invention.

There is provided a controllable element 10 having a pure divergent dynamic response for providing an output signal, $-e_o$, in response to an input $e_c$ from a control signal source 24. Controllable element 10 may be comprised of signal integrating means 25 such as Miller integrating amplifier or like means well known in the art for providing an output signal indicative of the time integral of an input signal. The output of integrator 25 is regeneratively fed back to the input to integrator 25, being combined with the input from signal source 24, by signal summing means 26. That such an arrangement comprises analog signalling means simulating a pure divergent dynamic form may be appreciated from the transform thereof or ratio of the output $e_o$ to the input $e_c$:

$$e_o = (e_o + e_c) \frac{K_t}{s} \quad (7)$$

Rearranging:

$$e_o \left( 1 - \frac{K_t}{s} \right) = e_c \frac{K_t}{s} \quad (8)$$

$$e_o \left( \frac{s}{K_t} - 1 \right) = e_c \quad (9)$$

$$-e_o \left( 1 - \frac{S}{K_t} \right) = e_c \quad (10)$$

Solving for the transform, $\frac{e_o}{e_c}(s)$:

$$\frac{-e_o}{e_c}(s) = \frac{1}{\left( 1 - \frac{s}{K_t} \right)} = \frac{1}{(1 - T_c s)} \quad (11)$$

Where:

$$T_c = \frac{1}{K_t}$$

There is further provided means 28 for adjusting the gain $K_t$ of integrator 25, whereby the time constant of the pure divergent dynamics of element 10 may be adjusted. The scale for knob 28 may be directly calibrated in terms of $T_c$, and hence in terms of $T_p$.

Control signal source 24 may be comprised of a center tapped potentiometer connected across a center tapped D.C. source, the two center taps being commonly connected to a second input or ground terminal of simulator element 10, as is well understood in the art. The wiper element of the potentiometer is connected in electrical circuit with summing means 26 and may be mechanically coupled in driven relationship to a pilot's spring-loaded control column 27 or like means simulating an operator's manual control means.

There is further provided signalling means 12 comprising a cathode ray tube 29 having a beam position control input thereto coupled to signal combining means such as a summing network of first and secnd summing resistors 30 and 31, each having a first terminal commonly connected to the control input of the cathode ray tube. The other terminal of first and second resistors 30 and 31 is coupled to the output of controlled element 10 and a random signal generator 11, respectively.

Random signal generator 11 is constructed and arranged to provide a random-appearing signal to the operator, the spectral content of the signal being chosen to simulate the type of signal to which the operator is likely to be subjected in an actual tracking task. An exemplary arrangement of such generator may include, for example, a selected number of sine-wave generators or oscillators, each of a mutually exclusive frequency, and means for combining the outputs of the sine-wave generators.

In normal operation of the arrangement of FIGURE 3, the difference $e_e$ between the outputs of random signal generator 11 and simulator element 10 is displayed on the face of cathode ray tube 29, in view of the pilot 13. Such display may comprise, for example, the beam position relative to a reference mark scribed on the face of the tube. The pilot operates control column 27 to provide control signals from signal source 24 so as to control the output $-e_o$ from controlled element 10, the sense of the change in control being such as to tend to reduce the amplitude of the displayed deviation. In other words, the pilot attempts to "track" the display.

Although the display signal to be tracked has been described as the difference between the outputs of generator 11 and element 10, alternatively the generator may be omitted from the arrangement of FIG. 3, whereby the pilot attempts to track the response of element 10 to the spectra provided by his own inputs to the system.

The gain $K_t$ of integrator 25 is initially set at a nominal value corresponding to a time constant $T_c$ greater than one-half second, for example. During the performance of the tracking task, the gain $K_t$ of intergrator 25 is progressively increased by means of element 28, thereby progressively reducing time constant $T_c$ until the operator cannot satisfactorily perform the tracking task. Such condition is indicated by a substantial increase in the average magnitude of the tracking error signal displayed by the cathode ray tube 29, or by an increase in the tracking error above a preselected norm or desired limit. Such inability of the operator to adequately perform the tracking task for such value of the pure divergent form of the controlled element 10, corresponds to the critical condition illustrated in FIGURE 2 by the critical gain condition (point 31) for the root locus branches 21' and 22' associated with the critical value, $1/T_{critical}$, for the pole or denominator root of the pure divergent form of the controlled element.

In other words, for such quantitative value of the controlled element dynamics, the ability of the pilot to perform the tracking task is limited by the minimum value of his effective time delay. Further, such critical quantitative value of the controlled element dynamics, is itself a measure of such effective time delay, as explained above in connection with the explanation of FIGURE 2.

Figure 4A:
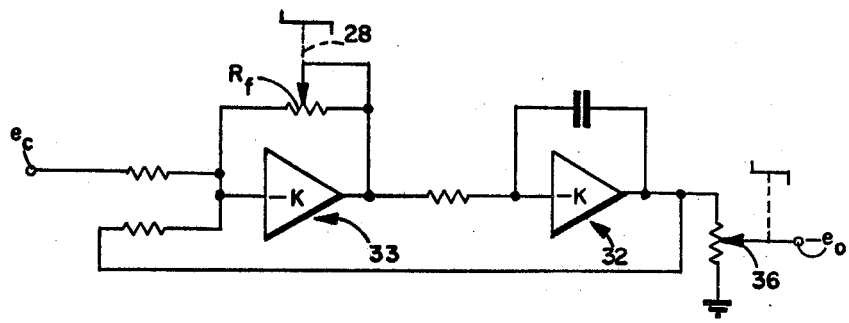
FIGURES 4a and 4b are alternate embodiments of one aspect of the invention.
Figure 4B:
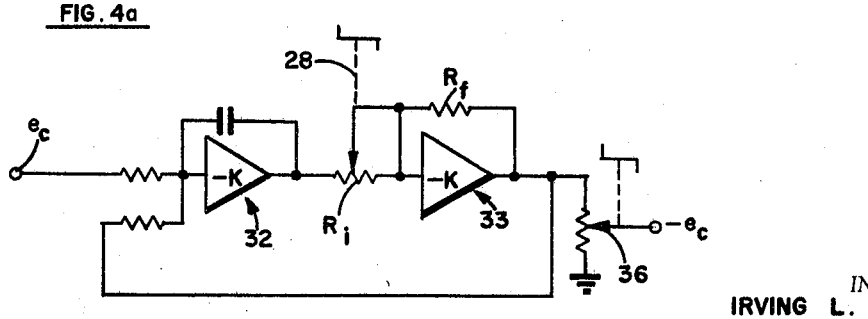

The means 28 for adjusting the time constant of controlled element 10 to achieve the critical time constant $T_c$, corresponding to the operator's minimum effective time delay, is shown with greater particularity in the alternative embodiments of FIGURES 4a and 4b.

FIGURES 4a and 4b are schematic arrangements of the adjustable analog device 10 of FIGURE 3 for simulating a controlled element having a pure divergent form Each of the embodiments of FIGURES 4a and 4b comprise a phase-inverting integrator-amplifier 32 and a phase-inverting summing amplifier 33 mutually connected in tandem in a closed-loop arrangement. The second phase-inversion stage is included for compensation of the first, whereby the closed-loop ararngement provides the required regenerative feedback, rather than negative feedback. Summing amplifier 33 further provides means for controlling the time-constant of the resulting pure divergent dynamics of controlled element 10 (of FIGURE 3). Being an extremely high-gain ($-K<10,000$) phase-inverting operational amplifier, and having a feedback impedance $R_f$ coupling the output thereof to the input thereof the effective gap of amplifier 33 is substantially equal to the ratio $R_f/R_i$, as is well understood in the analog computer art. Further, the effective forward-loop gain $K_t$ of each of the embodiments of FIGURES 4a and 4b is equal to the gain of integrating amplifier 32 multiplied by the gain $R_f/R_1$ of amplifier 33. Therefore, the forward-loop gain $K_t$, and hence the time-constant $T_c$ of the closed-loop pure divergent dynamics, may be conveniently varied by varying either the feedback resistor $R_f$ (as shown in the embodiment of FIGURE 4a) or the input resistor $R_1$ (as shown in the embodiment of FIGURE 4b).

Accordingly, it is to be appreciated that apparatus and method have been described for measuring the minimum effective time delay of an operator engaged in the performance of a tracking function.

Hence the concept of the invention has been thus far described as the use of a critical tracking task which limits the form of an operator's describing function, whereby the minimum time delay associated with such form may be conveniently quantitatively determined. Because of the significant relation of such time delay to potential tracking ability and the convenience and economy with which such quantitative data may be reliably and accurately generated by means of the invention for large population of subjects, the effects of drugs, such as stimulants and depressants, and environmental conditions upon a pilot's tracking ability may be more readily assessed. Further, in view of the fact that such operator time delay is due to neuromuscular system tension or conditions of the human operator, comparative measurements thereof may be used to indicate changes in a given subject or human operator; which data, when correlated with other medical observations, may be useful in the diagnosis of various medical conditions.

Although the concept of the invention has been described in terms of a critical task which both limits the form of the operator's describing function and provides a means for determining the minimum time delay thereof from the dynamics of the controlled element, the concept of the invention is not so limited. It is to be appreciated that as the non-minimum phase time constant, ($-T_c$) of the divergent dynamics of the controlled element is adjusted so as to constrain the allowable open loop system gain $K_{OL}$ (product of the gains $K_c$ of the controlled element and $K_p$ of the operator describing function), the human operator gain is correspondingly constrained. For example, where the time constant $T_c$ of the controlled element is adjusted to approach the critical value, as shown by element 17' in the root locus of FIGURE 2, the stable open loop system gain, $K_{OL}$, is constrained to a single value (or an infinitely small or narrow range of values), as previously described in connection with the description of FIGURE 2. In other words:

$$K_{OL}=K_pK_c=\text{a constant} \quad (12)$$

and $$K_p=K_{OL}/K_c \quad (13)$$

Accordingly, it is to be appreciated that, during that interval (for the critical time constant) during which the tracking task is being adequately performed by the operator, the gain term $K_p$ in the operator's describing function will be determined by such singular value for $K_{OL}$, and tends to vary inversely with adjustments in the gain $K_c$ of the controlled element.

The gain $K_c$ of the simulated controlled element 10 of FIGURE 3 may be adjusted by means of a gain-setting potentiometer 36 interposed in series with the input to summing resistor 30 of display means 12, or like means known in the art for adjusting the signal level of an electrical signal.

The human operator or human pilot cannot, of course, adapt or adjust his gain $K_p$ over an infinitely large range of values. The limits, or maximum and minimum values, of the operator gain $K_p$ may be determined by progressively increasing and decreasing the gain $K_c$ of the controlled element (under the circumstances of $1/T_c \rightarrow 1/T_{critical}$) until the pilot is unable to satisfactorily perform the tracking function. Such limits for $K_p$, or the ratio $K_{p\,max}/K_{p\,min}$, may be used to provide useful design criterion in the design or evaluation of manually controlled systems, particularly manually controlled systems the gains of which tend to vary in response to variations in the controlled environment. As described above, examples of such systems or controlled elements are the flight control syetems of aircraft, the aerodynamic effectiveness of which tend to vary with variations in the airspeed and pressure altitude of such vehicles.

Accordingly, method and apparatus have been described for constraining the form of an operator's describing function, and also for quantitatively constraining and determining such parameters as the gain and time delay of such constrained form. Although the form of the simulated controlled element has been illustrated as being a pure divergent form, $$Y_c=\frac{K_c}{(-T_cs+1)}$$

the scope of the invention is not so limited and other forms which include a divergent pole may be used. For example, the form $$Y_c=\frac{K_c}{s(-T_cs+1)}$$

may be employed, in which case the associated operator describing function is constrained to further include at least a numerator lead term or zero ($T_1s+1$) in the form of Equation 3; and the operator's time delay $T_p$, while not being precisely equal to the critical time constant of the simulator, yet tends to vary directly with it. Hence, the critical time constant is yet indicative of the time-delay of the operator's describing function. Such alternate form may be mechanized by the interposition of an additional integrator in series with element 10 of FIGURE 3.

Although the device and method of the invention has been described in terms of its application to the determination of the gain and time delay parameters of a human operator, the concept of the invention is not so limited, being equally applicable to the measurement of other self adaptive operators such as trained animals and self-adaptive control mechanisms.

Although the invention has been described and illustrated in detail, it is to be clearly understood that the same is by way of example only, and not by way of limitation.

We claim:
1. A method for constraining the describing function for an operator engaged in performing a tracking task comprising the steps of:
subjecting an operator to a controllable element having both adjustable dynamics of a divergent form and an adjustable gain, and
adjusting one of the gain and divergent tendencies of the dynamics of said controllable element until said operator is unable to effectively control said controllable element.

2. The method of claim 1 above in which said adjustable dynamics comprise one of a gain and time constant as to be indicative of a corresponding one of an operator describing function.

3. Tracking task apparatus for constraining the describing function of an operator comprising
A controllable element adapted to be controlled by an operator and having adjustable static and divergent dynamic response characteristics for providing an output signal;
A source of a selected reference signal; and
Display means responsive to said output signal and to said selected reference signal for providing a tracking error display indicative of the difference therebetween.

4. The device of claim 3 in which there is further provided indicating means cooperating with said controllable element for quantitatively indicating the value of an adjusted one of the response characteristics of said controlled element.

5. A method for determining the effective time delay of the describing function for an operator engaged in performing a tracking task, comprising the steps of:
Subjecting an operator to a controllable element having adjustable dynamics of a pure divergent form; and
Adjusting the divergent tendencies of said controlled element until said operator is unable to effectively control said element to be controlled.

6. A method for determining the effective time delay of the describing function for an operator engaged in performing a tracking task, comprising the steps of:
Subjecting an operator to a controllable element in accordance with a reference signal, said controlled element having adjustable dynamics of a pure divergent form; and
Adjusting the divergent tendencies of said controlled element until said operator is unable to effectively perform said tracking task.

7. A method for determining the effective time delay of the describing function for an operator engaged in performing a tracking task, comprising the steps of
Subjecting an operator to a controllable element which is to be controlled in accordance with the difference between a control reference and the actual performance of said element, said element having adjustable dynamics of a pure divergent form, and
Adjusting the dynamics of said adjustable controlled element until said operator is unable to maintain said difference within a preselected limit.

8. A tracking task simulator apparatus for measuring the minimum effective time delay ($T_p$) in the describing function ($K_p e^{-T_p s}$) of an operator comprising
A controllable element adapted to be controlled by an operator and having adjustable dynamic response characteristics of a pure divergent nature for providing an output signal;
A reference signal generator for providing a time-varying signal indicative of a preselected frequency spectrum;
Display means responsive to said output signal and said time-varying signal for providing a display indicative of the difference therebetween.

9. The device of claim 8 in which there is further provided indicating means responsively coupled to said controllable element for quantitatively indicating the time constant of said response characteristic of said controllable element.

10. The device of claim 8 in which said controllable element is comprised of a time-integrating element, the output of which is in regenerative closed-loop cooperation with an input thereto.

11. The device of claim 8 in which said controllable element has a transfer function of the form $$\left(\frac{K_p}{1-T_p s}\right)$$

12. The device of claim 8 in which said controllable element is comprised of a phase-inverting summing amplifier and a phase-inverting integrating amplifier connected in tandem, the output of said tandem arrangement being summed at the input thereto; and means for adjusting the gain of said tandem arrangement.

13. Tracking task simulator apparatus for measuring the minimum effective time delay ($T_p$) in the describing function ($K_e^{-T_p s}$) of an operator, comprising
A control column;
An adjustable source of a bi-polar signal responsively coupled to said control column;
A phase-inverting summing amplifier and a phase-inverting integrator amplifier connected in a tandem arrangement,
The output of said tandem arrangement and said bipolar signal being summed at the input of said tandem arrangement;
Gain adjusting means for adjusting the gain of said tandem arrangement;
A random signal generator; and
Cathode ray tube display means responsive to the outputs of said generator and said tandem arrangement for providing an indication of the difference therebetween.

14. The device of claim 13 in which there is further provided means responsive to said gain adjusting means for indicating the time constant of said closed-loop tandem arrangement.

15. The device of claim 13 in which there is further provided recording means responsive to said differences and to said gain adjusting means for indicating the time-constant of said closed-loop arrangement when said difference exceeds a preselection amplitude.

16. A method for determining the effective time delay of the describing function for an operator engaged in performing a tracking task, comprising the steps of
Subjecting an operator to a controllable element which is to be controlled in accordance with the difference between a control reference and the actual performance of said element, of the form $$\frac{K_c}{s(-T_c s+1)}$$

Adjusting the dynamics of said adjustable controlled element until said operator is unable to maintain said difference within a preselected limit.

17. A tracking task simulator apparatus for measuring the minimum effective time delay ($T_p$) in the describing function ($K_p e^{-T_p s}$) of an operator comprising
A controllable element adapted to be controlled by an operator and having adjustable dynamic response characteristics of the form $$\frac{K_c}{S(-T_c S 1)}$$

for providing an output signal;
A source of a time-varying signal; and
Display means responsive to said output signal and said time-varying signal for providing a display indicative of the difference therebetween.

(References on following page)

References Cited

UNITED STATES PATENTS

| | | | |
|---|---|---|---|
| 2,281,238 | 4/1942 | Greenwood | 330—99 |
| 3,069,626 | 12/1962 | Lungo | 330—103 X |
| 3,137,805 | 6/1964 | Shapiro | 315—30 |

FOREIGN PATENTS 830,686  3/1960  Great Britain.

OTHER REFERENCES

Single: "An Analog for Process Lags," pp. 113, 115, (2 pages) Control Engineering, October 1956.

Jackson: Synthesis of a Linear Quasi Transfer Function for the Operator in Man-Machine Systems, 1958 IRE Wescon Convention Record, Part 4.

Sweeney et al.: The Application of Feedback Techniques to the Measurement of Maximum Human Operator Bandwidth in Closed Loop Control, 1961, IRE International Convention Record, Part 5.

Young et al.: Adaptive Dynamic Response Characteristics of the Human Operator in Simple Manual Control IEEE Transactions on Human Factors in Electronics, September 1964, pp. 6–12.

Seidenstein et al.: The Relation of Electronic and Optical Display Gain to System Performance, IRE Transactions on Human Factors in Electronics March 1960, pp. 30–32.

Leonard: Optimizing Linear Dynamics for Human Operated Systems by Minimizing the Mean Square Tracking Error, IRE Wescon Convention Record, vol. 4, Part 4, Aug. 23–26, 1960.

EUGENE G. BOTZ, Primary Examiner

R. W. WEIG, Assistant Examiner

U.S. Cl. X.R.

35—104, 12; 235—184